July 27, 1954  S. MENDELSOHN  2,684,671
DUAL BALLISTOCARDIOGRAPHIC APPARATUS
Filed June 19, 1952  2 Sheets-Sheet 1

INVENTOR
SAMUEL MENDELSOHN
BY
ATTORNEY

July 27, 1954  S. MENDELSOHN  2,684,671
DUAL BALLISTOCARDIOGRAPHIC APPARATUS
Filed June 19, 1952  2 Sheets-Sheet 2
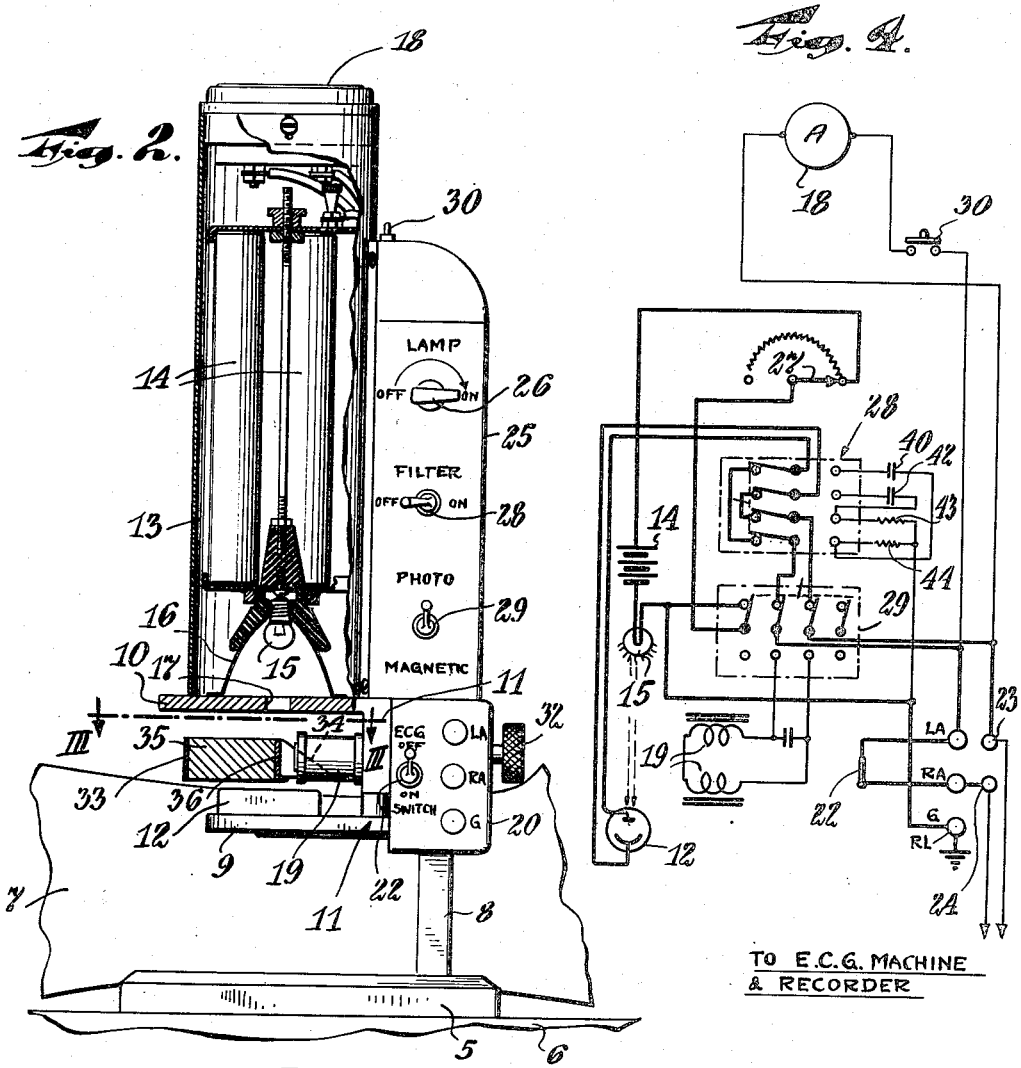
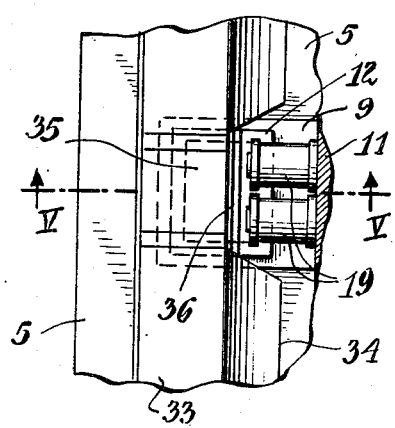
TO E.C.G. MACHINE & RECORDER
INVENTOR
SAMUEL MENDELSOHN
BY
ATTORNEY Patented July 27, 1954

2,684,671

UNITED STATES PATENT OFFICE 2,684,671

DUAL BALLISTOCARDIOGRAPHIC APPARATUS

Samuel Mendelsohn, Glen Ridge, N. J., assignor to Mendelsohn Research Laboratories, Inc., New York, N. Y., a corporation of New York Application June 19, 1952, Serial No. 294,363

7 Claims. (Cl. 128—2.06)

1

The present invention relates to a ballistocardiograph which is an apparatus for recording the mechanical body recoil due to the motion of the heart and surge of blood with each cardiac cycle.

Electrocardiographic apparatus has long been known to the medical profession and with this latter type apparatus a graphic chart is made, either by a stylus or photographically, of the body potential which fluctuates with the pulse beat. Such recordations are not too accurate so far as indicating a cardiac disease is concerned, because it is now well recognized that the electrocardiogram may be entirely normal even in the presence of severe heart disease.

In accordance with the present invention, a dual ballistocardiographic apparatus is herein described which permits the rapid recording of standardized displacement (photoelectric) and velocity (electro-magnetic) tracings, with a single setting of the apparatus. The resulting ballistocardiogram reflects the mechanical efficiency of the cardio-vascular system and from the diagnostic standpoint gives positive objective clinical evidence of organic heart disease which abnormality is readily discernible from the qualitative appearance of the ballistocardiogram. Simultaneous electrocardiographic (ECG) records may also be obtained with the ballistocardiographic apparatus of the present invention, for time reference purposes on standard single channel cardiographic machines by the flip of a switch.

It is accordingly the primary object of the present invention to provide a ballistocardiographic apparatus which will record both standardized displacement and velocity tracings with a single setting of the apparatus and which also permits the making of an electrocardiogram for time reference purposes.

Another object of the present invention is the provision of a dual ballistocardiographic apparatus for accurately recording qualitative data from which a diagnosis of angina pectoris, acute rheumatic carditis and coarctation of the aorta, as well as the prognosis and management of cases of myocardial infarction and cardiac failure, can be made.

Still further objects will become obvious to those skilled in the art by reference to the accompanying drawings wherein:

Figure 1 is a perspective fragmentary view showing the dual ballistocardiograph of the present invention as it is used on a patient, Fig. 2 is a side elevational view partly in cross-section of the ballistocardiograph of the present invention and as shown in Fig. 1,

2

Fig. 3 is a fragmentary plan view taken on the line III—III of Fig. 2,

Fig. 4 is a diagrammatic illustration of the electrical circuits for the ballistocardiograph of the present invention.

Figure 1:
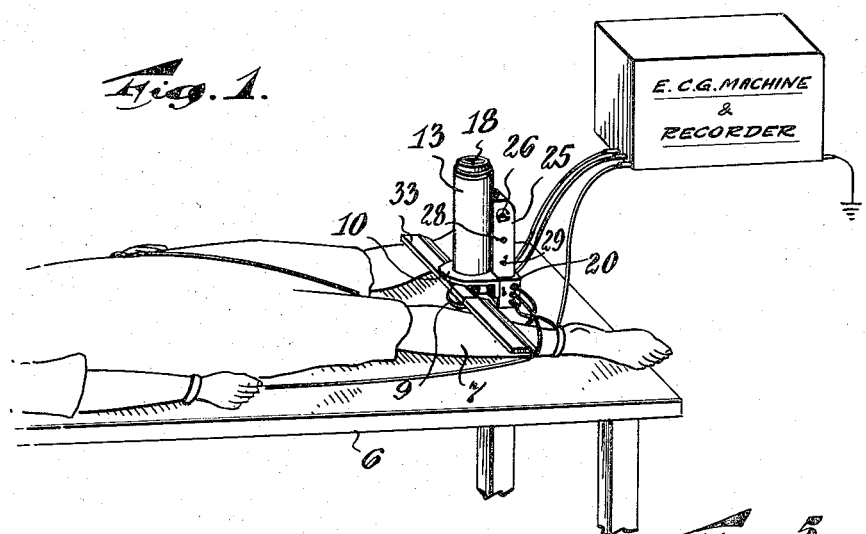

Referring now to the drawings in detail, the ballistocardiograph as therein shown comprises a platform or base 5 for resting on a table 6 between the legs of a patient 7, while reclining on the table, as shown in Fig. 1. Extending upwardly from this base 5 is a column 8 carrying a horizontally disposed lower platform 9 and a similar upper platform 10 which are parts of an adjustable support 11. The lower platform 9 is provided with a selenium type photocell 12 sensitive to light falling perpendicularly thereon as hereinafter described. The upper platform 10 supports a cylindrical housing 13 containing dry-cell batteries 14, serving as a controlled source of electrical energy for a lamp 15 also disposed in said housing 13, along with a suitable reflector 16, with the axis of the beam of light from this lamp 15 coinciding with the axes of both the cylindrical housing 13 and the reflector 16. An opening 17 is provided in the upper platform 10 which aligns with the axis of the light beam from the lamp 15, enabling such beam to impinge upon the photocell 12 carried by the lower platform 9.

A microammeter 18 forms a closure member for the upper end of the cylindrical housing 13 which is connected at the will of the operator in circuit with the photocell 12 for the purpose of recording photocell current in order to standardize the ballistocardiographic tracings, as hereinafter explained more in detail. An electromagnet 19 comprising a pair of windings with each winding surrounding an iron core is carried by the vertical portion of the adjustable support 11 with the axis of each iron core and its surrounding winding being disposed in a horizontal position and this parallel to, and approximately midway between, the two platforms 9 and 10. Also secured to the support 11 between the two platforms 9 and 10, but in a vertical plane disposed 90° relative to the axis of the electromagnet windings and cores, is a terminal plate 20 provided with three binding-post terminals LA, RA and G. This plate 20 is also provided with an "ECG" toggle switch 22 and on the side of the support 11 directly in back of this terminal plate 20 is a similar terminal plate (not shown) which is provided with two binding-post terminals 23 and 24 (Fig. 4). Immediately above the plate 20 and partially supported by the cylindrical housing 13 is a panel 25 which is provided with a rotatable button 26 for operating a rheostat 27 (Fig. 4) to control the intensity of the beam of light from the lamp 15, a "filter" toggle switch 28 which is of the four-pole double-throw type, and an additional four-pole double-throw toggle switch 29 for changing from "Photo" to "Magnetic," as desired. At the top of this panel 25 a momentary contact switch 30, such for example as a "Microswitch," is provided for connecting the microammeter 18 in parallel with the photoelectric or electromagnetic recording circuits, whenever desired by the operator. The entire support 11, together with the parts carried thereby, is vertically adjustable on the column 8 and held in the desired position by tightening the screw operated by rotation of the knurled knob 32.

The transmitting bar 33, which lies across the shins of the patient such as shown in Fig. 1, has a bevelled edge 34 usually directed toward the apparatus when in use. The center of this bar has its bevelled edge cut away on an angle and is provided with a center section formed of an alnico permanent magnet 35 as can be more fully appreciated from Fig. 3. The vertical face of this alnico center section is provided with an angle-facing 36, such as shown more clearly in Fig. 5, serving as a light-beam cut-off, as hereinafter more fully described.

The ballistocardiograph apparatus (hereinafter refered to as BCG apparatus) is placed into operation by positioning the apparatus on a steady table between the legs of a patient as shown in Fig. 1. The transmitting bar 33 is inserted between the platforms 9 and 10 as to move freely therebetween with its permanent alnico magnet in alignment with the electromagnet 19, as shown in Fig. 3, and the support 11 adjusted vertically of the column 8, by loosening the knob 32, raising the support 11 to the desired heighth and again tightening the knob 32, until the transmitting bar rests lightly on the shins of the patient with its bevelled edge directed footward of the patient toward the apparatus. An electronic electrocardiograph machine such as well known to the art (hereinafter referred to as ECG machine), either of the direct-writer or photographic, type may be used, such as shown by the legend "E. C. G. Machine & Recorder" in Fig. 1. If the machine uses "string" galvanometers electromagnetic tracings may be directly recorded but a special adapter is required for photoelectric recordings.

The ECG machine and recorder is connected to the binding posts 23 and 24, as shown in Figs. 1 and 4 (or to the binding post RA instead of 24, since they are bridged as shown in Fig. 4), for the purpose of amplifying the current generated by the BCG machine and recording the waveforms as well as to enable the making of both ballistocardiograms and electro-cardiograms as hereinafter more fully explained. The left arm of the patient is connected to the binding-post terminal LA, his right to the binding-post terminal RA, and his right leg to the binding-post terminal G (RL in Fig. 4) and to the corresponding terminal on the ECG machine, as seen in Fig. 1. The ECG machine is allowed to warm up and the customary standardization check of 1 millivolt=1 cm. (2 large squares on graph chart) made preparatory to operation. The photo-magnetic switch 29 is then moved to its up or "Photo" position while the filter switch 28 and simultaneous ECG switch 22 are moved to their respective "off" positions, as shown in Figs. 2 and 4. It will also be noted from Fig. 4 that in the "off" position of switch 22 the RA—LA binding post terminals are short-circuited and thus no current passes through the patient between his right and left arms in this "off" position of the ECG switch 22, so that the ECG machine is "off" in this position of switch 22 in the sense that the patient is not electrically connected to the ECG machine for an electrocardiographic recording at this time.

The ECG machine having now warmed up and been "standardized," the lamp switch and rheostat button 26 is next rotated clockwise, as shown in Fig. 2, which connects the battery 14 to the lamp 15, as seen from the circuit diagram of Fig. 4, and while being rotated to increase the intensity of the light from lamp 15 falling on the selenium photocell 12, the momentary contact switch 30 is depressed and rotation of the knob 26 continued, until the light intensity reaches the point where the current generated by the photocell 12 and flowing therefrom through the inner and outer blades of switch 28, and the two inner blades of switch 29 (which as previously stated are in the position shown in Fig. 4), thence to the terminals 23 and LA, as shown by the heavy black lines in Fig. 4, and then to the parallel connected microammeter 18 through depressed switch 30, causes the microammeter to read exactly 100 microamperes.

Figure 5:
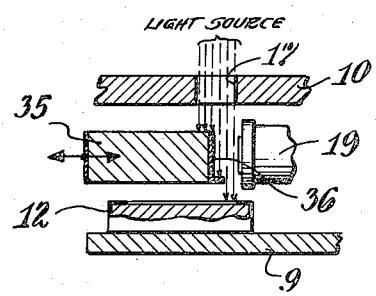
Fig. 5 is a fragmentary sectional view taken on the line V—V of Fig. 3.

The BCG machine is then moved forward on the table toward the feet of the patient, so that the shadow of the transmitting bar 33 falls on the selenium photocell 12 disposed below the bar on the platform 9, as can be seen from Fig. 2. The momentary contact push-button switch 30 is again depressed and the transmitting bar 33 then adjusted along the shins of the patient free of any contact with the BCG machine, until the bar 33 covers the front nine-tenths of the selenium photocell 12 with the edge of the shadow of the bar parallel to the long border of the photocell, as shown in Fig. 5. When the bar is actually adjusted to cover nine-tenths of the selenium photocell 12 this will be accurately indicated by the microammeter reading 10 microamperes upon depression of the momentary contact switch 30, since the intensity of the light from the lamp 15 impinging on the selenium photocell 12 will be decreased by interception of the nine-tenths of the bar, thus causing a decrease of 90% in the current generated by the selenium photocell, as indicated on the microammeter. Inasmuch as the transmitting bar 33 is now resting on the shins of the patient and in a fixed relation to the photocell 12, but free to move without touching any part of the BCG machine, such machine is now "standardized" and ready for use.

Figure 7:
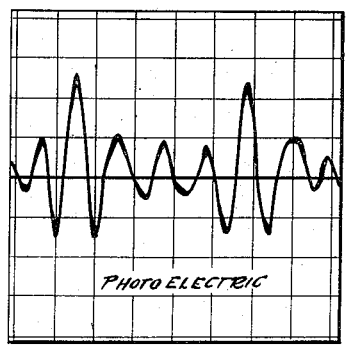
Fig. 7 is a graphic illustration showing the type of curve traced by the ballistocardiograph of the present invention when a standardized displacement (photoelectric) recording is made.

The ECG machine lead selector switch (not shown) is then moved to the customary Lead I position and with the patient holding his breath in slight inspiration the customary Paper or Camera Drive is moved to its "on" or "run" position. Several successive recordings are then made with the patient holding his breath first in deep inspiration and then in deep expiration with the resulting patient reaction causing movement of the transmitting bar 33 along the shins of the patient toward and away from the BCG machine, varying the amount of light impinging upon the photocell 12 due to the angle-facing 36 intercepting more or less of the light beam from the lamp 15 which comes through the opening 17 as can be better appreciated from Fig. 5. This variation in the light beam in turn varies the current generated by the selenium photocell 12 and transmitted (from binding-post terminals 23 and LA) to the ECG machine where it is amplified and produces the photoelectric (displacement) ballistocardiogram, such as shown in Fig. 7, which will be standard and reproducible because of initial calibration of 100 microamperes followed by final reading of 10 microamperes with customary ECG machine standardization of 1 millivolt=1 cm.

Ordinarily the displacement ballistocardiogram recorded in the above manner is sufficient but there may frequently be conditions when the patient is dyspneic. Under this condition, in order to control marked baseline wandering on the chart while recording the photoelectric ballistocardiogram, the four-pole double-throw filter switch 28 is moved to its "on" position. As seen in Fig. 4, this is to the right hand position of the double-throw switch which connects condensers 40 and 42 as well as resistors 43 and 44 and comprising a filter arrangement in the circuit with photocell 12 and the ECG machine, and the recording is made as above described. However, it is to be noted that standardization by the microammeter 18 must be made in the manner above described prior to movement of the filter switch 28 to its "on" position, since the needle on the microammeter 18 will not register when the filter, comprising the condensers 40 and 42 and resistors 43 and 44, are in the photocell circuit. Moreover, because of the alterations in the photoelectric ballistocardiogram, induced by the filter system, the latter should be used only when absolutely necessary.

Figure 6:
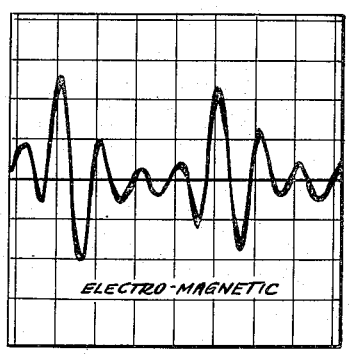
Fig. 6 is a graphic illustration showing the type of curve traced by the ballistocardiograph of the present invention when a velocity (electromagnetic) recording is made.

Having now recorded photoelectric (displacement) ballistocardiogram the technician then turns the four-pole double throw switch 29 downward to its "magnetic" position. Movement of this latter switch accordingly interrupts the circuit from the battery 14 to the lamp 15 thus extinguishing the latter and at the same time the photocell circuit is interrupted by the two inner switch blades or contacts of the switch 29 and the electromagnet 19 is thereby connected to the ECG machine. While the patient is breathing normally the customary Paper or Camera Drive of the ECG machine is again moved to its "on" or "run" position. An electromagnetic (velocity) ballistocardiogram in slight inspiration, then deep inspiration and finally deep expiration, is recorded due to the vibration of the transmitting bar 33 causing its permanent alnico magnet to generate a magnetic field current in to the electromagnet 19 which is again transmitted through switch 29 and binding-post terminals 23 and LA to the ECG machine and recorder and resulting in an electromagnetic (velocity) ballistocardiogram, as shown in Fig. 6.

In addition to the foregoing, provision is made to take a simultaneous ECG recording, along with the ballistocardiogram, for timing purposes and particularly in those cases in which the component waves of the ballistocardiogram cannot be readily identified by inspection. The principle involved is the superimposition of the ECG record (Lead I) on the ballistocardiographic tracing. Since the QRS complex of the ECG precedes the nadir of the I-wave of the ballistocardiogram by 0.16 to 0.20 second (4 to 5 small squares on the recording paper), this is utilized for timing purposes when using the single channel ECG machines commonly employed in medical practice.

Figure 8:
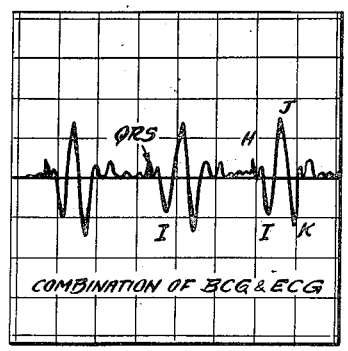
Fig. 8 is a graphic illustration showing the type of curve traced by the ballistocardiograph of the present invention when a simultaneous ballistocardiogram and an electrocardiogram are recorded.

To take such simultaneous recording the right arm, left arm, and right leg of the patient are connected to the respective binding-post terminals as previously described and as shown in Fig. 1. A ballistocardiogram recording is then made in the manner above described which may be photoelectric, filtered photoelectric or electromagnetic. The ECG switch 22 is then moved downwardly to its "on" position, as viewed from Fig. 2, which thus opens up the normal direct connection between the binding-post terminals LA and RA such as shown in Fig. 4. Movement of the ECG switch to its "on" position thus allows the current from the photocell circuit or the potential of the electromagnetic circuit (depending upon the position of switch 29 at the moment) to be superimposed upon the customary electrocardiographic circuit since the patient has his left arm and right arm connected to the binding-post terminals LA and RA and the "E. C. G. Machine and Recorder" is likewise connected to these same binding-post terminals, as clearly shown in Fig. 1. A tracing on the recorder accordingly results, such as shown in Fig. 8, representing a simultaneously made combination ballistocardiographic (BCG) and electrocardiographic (ECG) curve after which a customary electrocardiogram may be made in the usual manner. The QRS complex of ECG is then identified on the simultaneous record and the I wave of the ballistocardiogram labeled 4 to 5 small squares to the right of the QRS, such as shown in Fig. 8. The component waves of the ballistocardiogram may then be identified readily on all tracings.

The ballistocardiogram tracings thus produced give an interpretation as to abnormal conditions but these are not specific for any one disease entity. Some of the most usual variations may be a marked respiratory variation in amplitude wherein the expiratory waves are less than 50% of the height in inspiration or there may be a low or absence of I-waves in which the latter are less than 15% of the main J- or K-waves in photoelectric (displacement) records or wherein the I-waves are completely absent in electromagnetic (velocity) recordings. Still further variations might include slurring or notching of component waves, such as tall H-waves, prominent L or other diastolic waves (with photoelectric records), or short or deep, wide K-waves and extremely low or high amplitude. These alterations pertain primarily to the customary longitudinal ballistocardiograms obtained in the horizontal position as shown and described herein although lateral, antero-posterior and vector BCG tracings may also be taken with the direct dual ballistocardiograph of the present invention.

From the foregoing description taken in conjunction with the accompanying drawing it should become obvious to those skilled in the art that a direct recording dual ballistocardiographic apparatus is provided by the present invention. Moreover, while only one specific embodiment of such invention has been herein shown and described, it is to be understood that still further modifications thereof may be made without departing from the present invention.

I claim:

1. A ballistocardiographic apparatus comprising a base, a support adjustable relative to said base and provided with a photocell and an electromagnet as well as a lamp positioned so that the light beam therefrom impinges on said photocell, binding-post terminals on said apparatus for connection to an electrocardiographic recorder arranged to selectively make a photoelectric displacement tracing and an electromagnetic velocity tracing as desired, a transmitting bar provided with a permanent magnet center section disposed between said photocell and said lamp with its magnetic section in alignment with said electromagnet and arranged to move freely in response to rhythmic longitudinal body movement during each cardiac cycle when resting on the shins of a patient, and a switch movable to one selected position to connect said photocell in circuit with said binding-post terminals to cause said terminals to be subjected to a variation in current in response to interception of said light beam by said transmitting bar during its rhythmic movement with the resulting recordation of a tracing by the electrocardiographic recorder representative of photoelectric displacement and said switch being movable to another selected position to connect said electromagnet in circuit with said binding-post terminals to cause said terminals to be subjected to a variation in potential in response to the influence of the permanent magnet center section of said transmitting bar on said electromagnet during rhythmic movement of said transmitting bar with the resulting recordation of a tracing by the electrocardiographic recorder representative of an electromagnetic velocity.

2. A ballistocardiographic apparatus comprising a base, a support adjustable relative to said base and provided with a photocell and an electromagnet as well as a lamp positioned so that the light beam therefrom impinges in said photocell, binding-post terminals on said apparatus for connection to an electrocardiographic recorder arranged to selectively make a photoelectric displacement tracing and an electromagnetic velocity tracing as desired, a transmitting bar provided with a permanent magnet center section disposed between said photocell and said lamp with its magnetic section in alignment with said electromagnet and arranged to move freely in response to rhythmic longitudinal body movement during each cardiac cycle when resting on the shins of a patient, a switch movable to one selected position to connect said photocell in circuit with said binding-post terminals to cause them to be subjected to a variation in current in response to interception of said light beam by said transmitting bar during its rhythmic movement with the resulting recordation of a tracing by the electrocardiographic recorder representative of photoelectric displacement, and said switch being movable to another selected position to connect said electromagnet in circuit with said binding-post terminals to cause the latter to be subjected to a variation in potential in response to the influence of the permanent magnet center section of said transmitting bar on said electromagnet during rhythmic movement of said transmitting bar with the resulting recordation of a tracing by the electrocardiographic recorder representative of an electromagnetic velocity, and another switch operable to cause the current supplied at a given moment to said binding-post terminals to be superimposed upon the current customarily supplied to the patient during the making of an electrocardiogram whereby a simultaneous ballistocardiographic and electrocardiographic tracing results.

3. A ballistocardiographic apparatus comprising a base, a support adjustable relative to said base and provided with a photocell and an electromagnet as well as a lamp positioned so that the light beam therefrom impinges on said photocell, binding-post terminals on said apparatus for connection to an electrocardiographic recorder arranged to selectively make a photoelectric displacement tracing and an electromagnetic velocity tracing as desired, a transmitting bar provided with a permanent magnet center section disposed between said photocell and said lamp with its magnetic section in alignment with said electromagnet and arranged to move freely in response to rhythmic longitudinal body movement during each cardiac cycle when resting on the shins of a patent, a switch movable to one selected position to connect said photocell in circuit with said binding-post terminals to cause said terminals to be subjected to a variation in current in response to interception of said light beam by said transmitting bar during its rhythmic movement with the resulting recordation of a tracing by the electrocardiographic recorder representative of photoelectric displacement, and said switch being movable to another selected position to connect said electromagnet in circuit with said binding-post terminals to cause said terminals to be subjected to a variation in potential in response to the influence of the permanent magnet center section of said transmitting bar on said electromagnet during rhythmic movement of said transmitting bar with the resulting recordation of a tracing by the electrocardiographic recorder representative of an electromagnetic velocity, and a microammeter momentarily connectable at will in the circuit with said photocell for standardization-test purposes and connectable in circuit with said electromagnet when desired.

4. A ballistocardiographic apparatus comprising a base, a support adjustable relative to said base and provided with a photocell and an electromagnet as well as a lamp positioned so that the light beam therefrom impinges on said photocell, binding-post terminals on said apparatus for connection to an electrocardiographic recorder arranged to selectively make a photoelectric displacement tracing and an electromagnetic velocity tracing as desired, a transmitting bar provided with a permanent magnet center section disposed between said photocell and said lamp with its magnetic section in alignment with said electromagnet and arranged to move freely in response to rhythmic longitudinal body movement during each cardiac cycle when resting on the shins of a patient, a switch movable to one selected position to connect said photocell in circuit with said binding-post terminals to cause said terminals to be subjected to a variation in current in response to interception of said light beam by said transmitting bar during its rhythmic movement with the resulting recordation of a tracing by the electrocardiographic recorder representative of photoelectric displacement, and said switch being movable to another selected position to connect said electromagnet in circuit with said binding-post terminals to cause said terminals to be subjected to a variation in potential in response to the influence of the permanent magnet center section of said transmitting bar on said electromagnet during rhythmic movement of said transmitting bar with the resulting recordation of a tracing by the electrocardiographic recorder representative of an electromagnetic velocity, a microammeter momentarily connectable at will in the circuit with said photocell for standardization-test purposes and connectable in circuit with said electromagnet when desired, and a further switch operable to cause the current supplied at a given moment to said binding-post terminals to be superimposed upon the current customarily flowing in a patient circuit during the making of an electrocardiogram whereby a simultaneous ballistocardiographic and electrocardiographic tracing results on the recorder.

5. A ballistocardiographic apparatus comprising a base, a support adjustable relative to said base and provided with a photocell and an electromagnet as well as a lamp positioned so that the light beam therefrom impinges on said photocell, binding-post terminals on said apparatus for connection to an electrocardiographic recorder arranged to selectively make a photoelectric displacement tracing and an electromagnetic velocity tracing as desired, a transmitting bar provided with a permanent magnet center section disposed between said photocell and said lamp with its magnetic section in alignment with said electromagnet and arranged to move freely in response to rhythmic longitudinal body movement during each cardiac cycle when resting on the shins of a patient, a switch movable to one selected position to connect said photocell in circuit with said binding-post terminals to cause said terminals to be subjected to a variation in current in response to interception of said light beam by said transmitting bar during its rhythmic movement with the resulting recordation of a tracing by the electrocardiographic recorder representative of photoelectric displacement, and said switch being movable to another selected position to connect said electromagnet in circuit with said binding-post terminals to cause said terminals to be subjected to a variation in potential in response to the influence of the permanent magnet center section of said transmitting bar on said electromagnet during rhythmic movement of said transmitting bar with the resulting recordation of a tracing by the electrocardiographic recorder representative of an electromagnetic velocity, a filter switch carried by said apparatus and operable to connect a filter arrangement in circuit with said photocell to steady the ballistocardiographic tracing as recorded with dyspneic patients, a microammeter momentarily connectable at will in the circuit with said photocell for standardization-test purposes and connectable in circuit with said electromagnet when desired, and a further switch carried by said apparatus and operable to cause the current supplied at a given moment to said binding-post terminals to be superimposed upon the current customarily flowing in a patient circuit during the making of an electrocardiogram whereby a simultaneous ballistocardiographic and electrocardiographic tracing results on the recorder.

6. A ballistocardiographic apparatus comprising a base member provided with a column, a support adjustable on said column comprising a lower platform having a photocell disposed thereon, an upper platform provided with an opening therein immediately above said photocell, a cylindrical housing on said upper platform having a battery therein and a lamp positioned so that the light beam therefrom passes through the opening in said upper platform and impinges on said photocell, an electromagnet on said adjustable support between said upper and lower platforms, a terminal plate on said apparatus having binding-post terminals for connection to an electrocardiographic recorder arranged to selectively make a photoelectric displacement tracing and an electromagnetic velocity tracing as desired, a switch carried by said terminal plate and operable to cause either the current supplied by the circuit including said photocell to said binding-post terminals or the potential of the circuit including said electromagnet to be impressed on said binding-post terminals and hence superimposed upon the customary patient circuit during the making of an electrocardiogram whereby a simultaneous ballistocardiographic and electrocardiographic tracing results on the recorder, a transmitting bar provided with a permanent magnet center section disposed between said upper and lower platforms with its magnetic section in alignment with said electromagnet and arranged to move freely in response to rhythmic longitudinal body movement during each cardiac cycle when resting on the shins of a patient, a panel carried by said adjustable support and provided with a selector switch movable to one position to connect said photocell in circuit with said binding-post terminals to cause said terminals to be subjected to the variation in current in response to interception of said light beam by said transmitting bar during its rhythmic movement with the resulting recordation of a tracing by the electrocardiographic recorder representative of photoelectric displacement, and said selector switch being movable to another position to connect said electromagnet in circuit with said binding-post terminals to cause said terminals to be subjected to a variation in potential in response to the influence of the permanent magnet center section of said transmitting bar on said electromagnet during rhythmic movement of said transmitting bar with the resulting recordation of a tracing by the electrocardiographic recorder representative of an electromagnetic velocity, a filter switch carried by said panel and operable to connect a filter arrangement in circuit with said photocell to steady the ballistocardiographic tracing as recorded with dyspneic patients, and a rheostat switch carried by said panel and operable to control the energy supplied by said battery to said lamp.

7. A ballistocardiographic apparatus comprising a base member provided with a column, a support adjustable on said column comprising a lower platform having a photocell disposed thereon, an upper platform provided with an opening therein immediately above said photocell, a cylindrical housing on said upper platform having a battery therein and a lamp positioned so that the light beam therefrom passes through the opening in said upper platform and impinges on said photocell, a microammeter froming a closure member for the upper end of said cylindrical housing, an electromagnet on said adjustable support between said upper and lower platforms, a terminal plate on said apparatus having binding-post terminals for connection to an electrocardiographic recorder arranged to selectively make a photoelectric displacement tracing and an electromagnetic velocity tracing as desired, a switch carried by said terminal plate and operable to cause either the current supplied by the circuit including said photocell to said binding-post terminals or the potential of the circuit including said electromagnet to be impressed on said binding-post terminals and hence either the current or potential as selected to be superimposed upon the customary patient circuit during the making of an electrocardiogram whereby a simultaneous ballistocardiographic and electrocardiographic tracing results on the recorder, a transmitting bar provided with a permanent magnet center section disposed between said upper and lower platforms with its magnetic section in alignment with said electromagnet and arranged to move freely in response to rhythmic longitudinal body movement during each cardiac cycle when resting on the shins of a patient, a panel carried by said adjustable support and provided with a selector switch movable to one position to connect said photocell in circuit with said binding-post terminals to cause said terminals to be subjected to the variation in current in response to interception of said light beam by said transmitting bar during its rhythmic movement with the resulting recordation of a tracing by the electrocardiographic recorder representative of a photoelectric displacement, and said selector switch being movable to another position to connect said electromagnet in circuit with said binding-post terminals to cause said terminals to be subjected to a variation in potential in response to the influence of the permanent magnet center section of said transmitting bar on said electromagnet during rhythmic movement of said transmitting bar with the resulting recordation of a tracing by the electrocardiographic recorder representative of an electromagnetic velocity, a filter switch carried by said panel and operable to connect a filter arrangement in circuit with said photocell to steady the ballistocardiographic tracing as recorded with dyspneic patients, a rheostat switch carried by said panel for controlling the energy supplied by said battery to said lamp, and a momentary contact switch carried by said support and operable when desired to connect said microammeter in circuit with said photocell and said binding-post terminals and hence with said electrocardiographic recorder for standardization-test purposes.

References Cited in the file of this patent

The American Journal of Physiology, Vol. 142, No. 1, Aug. 1, 1944, pp. 1-11 cited. Article by John L. Nickerson and Howard J. Curtis. "The Design of the Ballistocardiograph." A copy is in the Scientific Library of the Patent Office.

American Journal of Medicine, Dec. 1949, pp. 751-755, Vol. VII. "Some Technics for Recording the Ballistocardiogram Directly From the Body," by William Dock and Felix Taubman. A copy is in the Armed Services Medical Library, Washington, D. C.